(12) United States Patent
Chahal et al.

(10) Patent No.: US 7,438,178 B2
(45) Date of Patent: Oct. 21, 2008

(54) COMPOSITE CONVEYING BELT

(75) Inventors: Vinod Kumar Chahal, East Amherst, NY (US); Richard A. Miller, Williamsville, NY (US)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/895,951

(22) Filed: Aug. 28, 2007

(65) Prior Publication Data

US 2008/0116043 A1 May 22, 2008

Related U.S. Application Data

(60) Provisional application No. 60/859,376, filed on Nov. 16, 2006.

(51) Int. Cl.
B65G 15/34 (2006.01)

(52) U.S. Cl. .................................... 198/847; 198/844.1

(58) Field of Classification Search ............. 198/844.1, 198/846, 847
See application file for complete search history.

(56) References Cited

U.S. PATENT DOCUMENTS

| | | | |
|---|---|---|---|
| 2,377,650 A | 7/1945 | Reimel | |
| 3,212,627 A | 10/1965 | Beebee | |
| 4,257,833 A * | 3/1981 | Jensen | 198/847 |
| 4,280,620 A | 7/1981 | Baker, Jr. | |
| 4,650,068 A * | 3/1987 | Vanassche et al. | 198/847 |
| 4,928,812 A * | 5/1990 | van Calker et al. | 198/847 |
| 5,326,411 A | 7/1994 | Arnold | |
| 5,495,935 A | 3/1996 | Zabron et al. | |
| 5,595,284 A | 1/1997 | Takahashi et al. | |
| 5,609,242 A * | 3/1997 | Hutchins et al. | 198/847 |
| 5,753,085 A | 5/1998 | FitzPatrick | |
| 5,906,269 A | 5/1999 | Zabron et al. | |
| 6,260,692 B1 | 7/2001 | Sashide et al. | |
| 6,427,728 B1 | 8/2002 | Maguire et al. | |
| 6,986,419 B2 | 1/2006 | Nishikita | |
| 6,994,210 B2 | 2/2006 | Kerwel et al. | |
| 7,267,219 B2 * | 9/2007 | Vogt | 198/847 |

FOREIGN PATENT DOCUMENTS

| | | |
|---|---|---|
| EP | 0 046 690 A1 | 3/1982 |
| EP | 0 989 078 A2 | 3/2000 |
| GB | 942765 | 11/1963 |
| GB | 1 228 226 | 4/1971 |
| GB | 1411297 | 10/1975 |
| JP | 09 030723 | 2/1997 |
| WO | WO 96/22239 | 7/1996 |

* cited by examiner

*Primary Examiner*—James R Bidwell
(74) *Attorney, Agent, or Firm*—Hodgson Russ LLP

(57) ABSTRACT

A conveying belt suitable for powerturn conveying applications. The conveying belt has a mult-layer structure with layers of parallel laid yarns disposed in various angles relative to the machine direction. The parallel yarns are stitchbonded to a multiply interwoven scrim to form a subassembly. A batt of staple fibers is needled to the scrim and the batt and subassembly are encapsulated by a polymer.

26 Claims, 8 Drawing Sheets

16: Top BATT LAYER

13: Parallel Laid Yarns in (+45°, -45° & 90° directions)

10: Woven Scrim

19: Bottom BATT LAYER

| Orientation Angles (MD = 0°) | 0° | 90° | -45° | +45° |
|---|---|---|---|---|
| Belt Weight | 0.55 oz/ft², 2.7 Kg/m² | | | |
| Belt Thickness | 0.110 inch, 2.8 mm | | | |
| Coefficient of Friction – Top Surface | 0.45 | | | |
| Coefficient of Friction – Bottom Surface | 0.22 | | | |
| Tear Resistance (lbf) | 334 | 203 | 278 | 227 |
| Tear Resistance (N) | 1516 | 922 | 1262 | 1030 |
| Load @1.5% extension (lbf/inch) | 140 | 101 | 60 | 65 |
| Load @1.5% extension (N/mm) | 25 | 18 | 10.7 | 11.6 |

Figure 2: Physical properties of composite belt made from woven scrim and stitchbonded triaxial yarns.

|  | Present Invention | Prior Art "A" | Prior Art "B" |
|---|---|---|---|
| Belt Weight (oz/ft², Kg/m²) | 0.55, 2.7 | 1.05, 5.1 | 0.93, 4.5 |
| Belt Thickness (inch, mm) | 0.110, 2.8 | 0.180, 4.6 | 0.150, 3.8 |
| Coefficient of Friction – Top Surface | 0.45 | 0.22 | 0.30 |
| Coefficient of Friction – Bottom Surface | 0.22 | 0.19 | 0.29 |

|  | Tear Resistance (N) | | | | Load @1.5% extension (N/mm) | | | |
|---|---|---|---|---|---|---|---|---|
| Orientation Angles (MD = 0°) | 0° | 90° | +45° | -45° | 0° | 90° | +45° | -45° |
| Present Invention | 1516 | 922 | 1262 | 1030 | 25 | 18 | 10.7 | 11.6 |
| Prior Art "A" | 2286 | 1321 | 1422 | 1448 | 20 | 8.8 | 4.5 | 3.8 |
| Prior Art "B" | 244 | 401 | 249 | 323 | 12 | 1.9 | 2.3 | 2.3 |

Figure 3: Physical properties of composite belts vs. powerturn belt made from interwoven scrim and stitchbonded triaxial yarns.

Figure 4: Tensile Moduli (N/mm) of Powerturn Belt made of conventional woven biaxial reinforement.

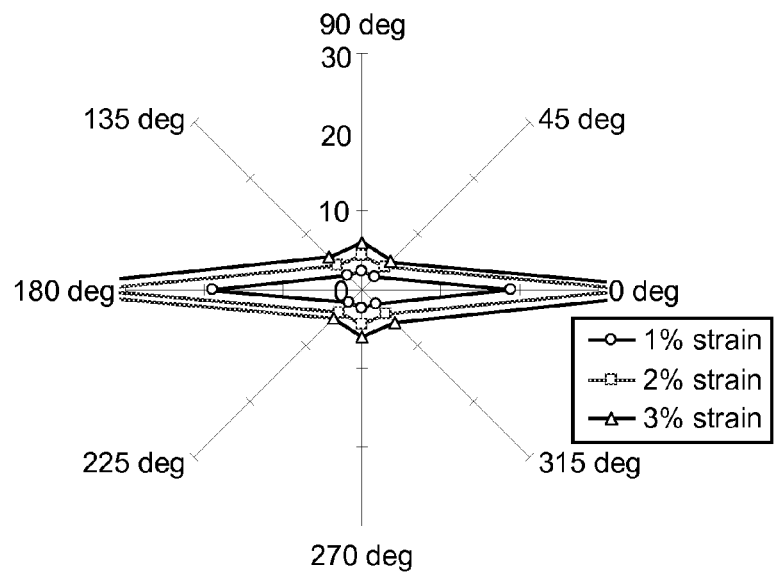

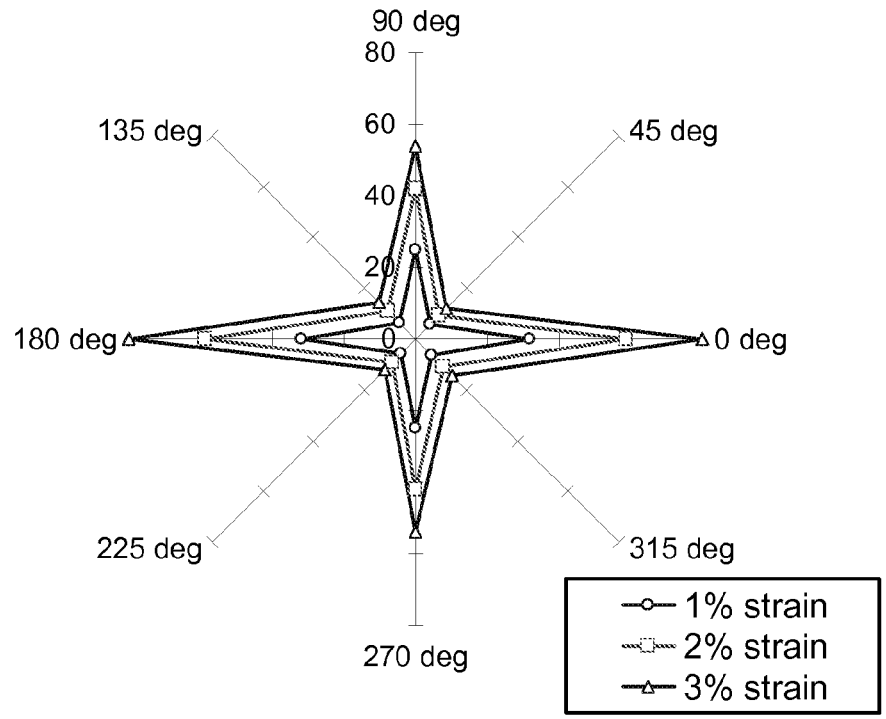
Figure 5: Tensile Moduli (N/mm) of belt made of Balanced Woven biaxial fabric reinforcement.
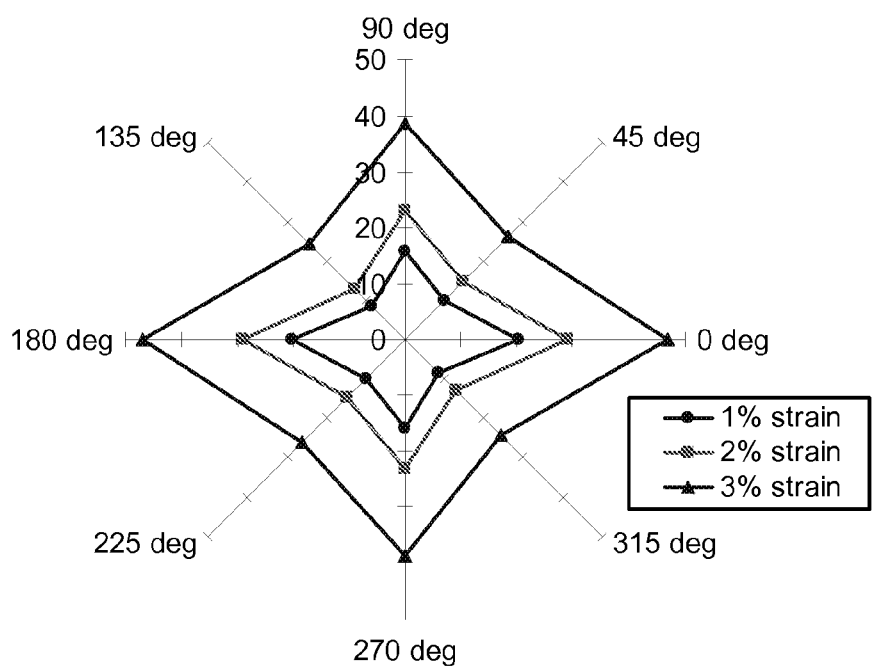
Figure 6: Tensile Moduli (N/mm) of Powerturn Belt (*present invention*).

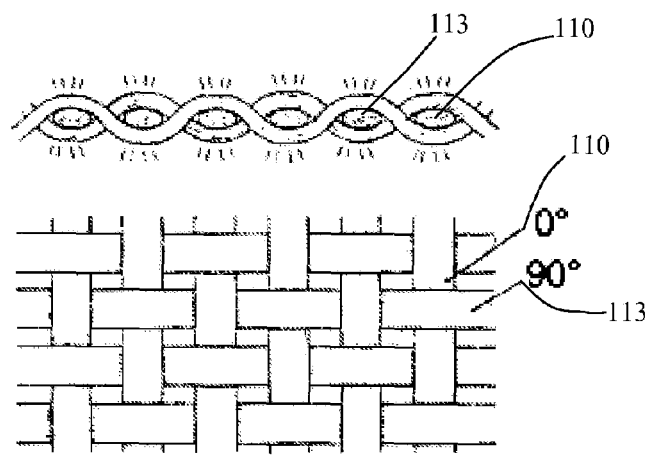
Figure 11: Plain Woven Scrim
(0°: Machine direction warp yarns, 90°: Cross machine direction weft yarns)
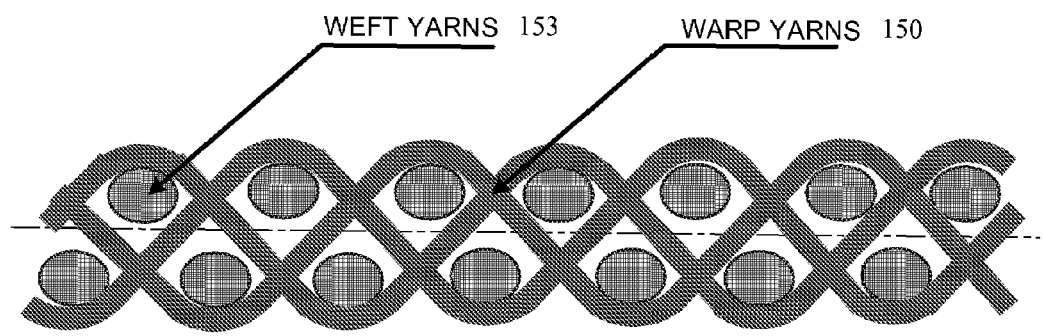
Figure 12: INTERWOVEN 2-PLY FABRIC

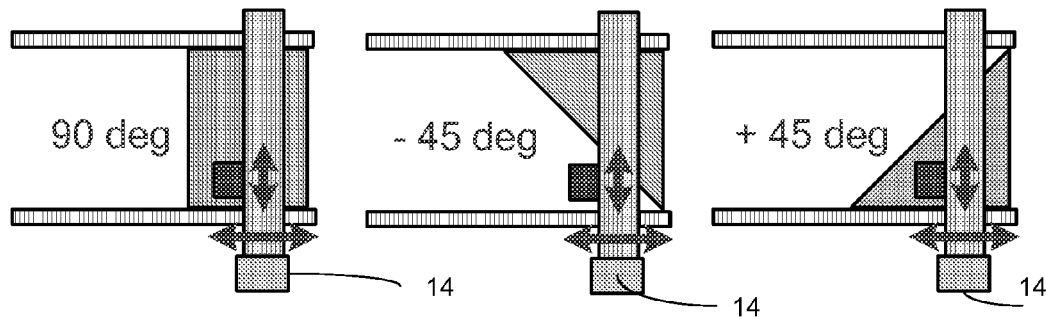
Figure 13: Multi-axial yarn feed device with yarns laid in three layers along +45, -45 and 90 degree directions
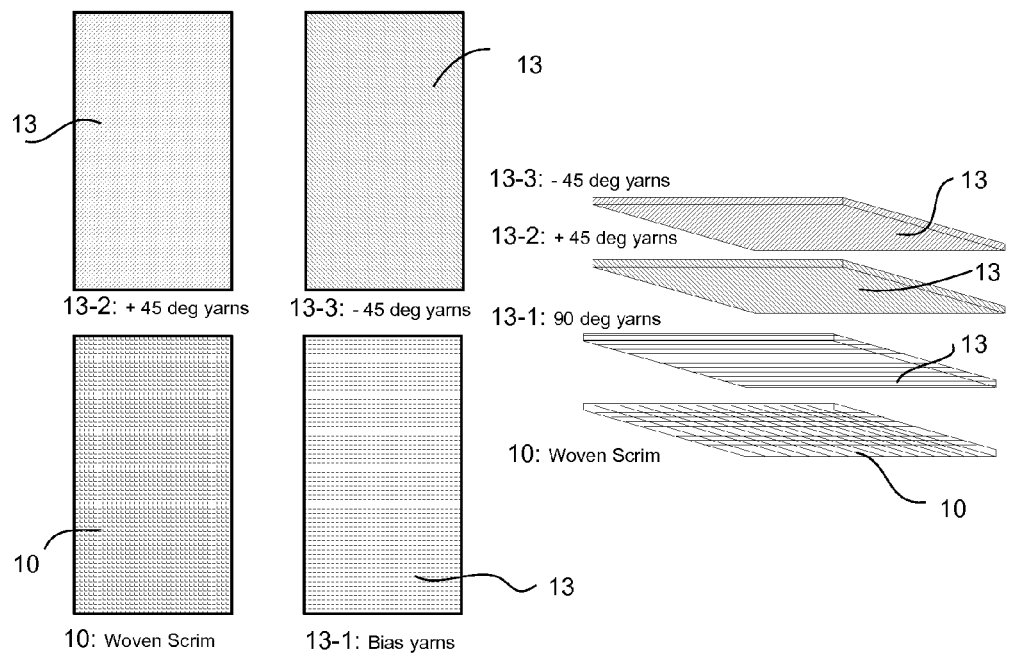
Figure 14: Orientation of yarns in woven scrim and parallel laid yarns

COMPOSITE CONVEYING BELT

CROSS-REFERENCE TO RELATED APPLICATION

This application claims the benefit of U.S. Provisional Patent Application No. 60/859,376 filed on Nov. 16, 2006, which is incorporated herein by reference.

FIELD OF THE INVENTION

The present invention relates to conveyor belt applications and specifically, powerturn conveyor belt applications.

BACKGROUND OF THE INVENTION

Powerturn conveyor belt applications have the following characteristics: the movement of the endless belt around the conveying path includes a curvilinear path with conveying angles ranging from approximately 30 degrees to 180 degrees. As the belt rounds the curve, the principal load axes change continuously and there is no well-defined machine direction ("MD") axis. Also, the surface velocity of the belt varies across radial direction as the belt travels around the curvilinear path. To achieve dimensional stability in powerturn conveyors, certain belt characteristics are desirable such as low to moderate stretch, isotropy in tensile moduli and flexural rigidity within the 2-D belt plane. Accordingly, there is a need for a stronger, lighter belt for powerturn conveyor belt applications.

SUMMARY OF THE INVENTION

The present invention meets the above described need by providing a belt design that enables control of desired directional belting properties, imparts exceptionally high tear strength, enables lower belt weight, and enables thinner designs for conveyor belts.

The conveyor belt includes a scrim having a first side and a second side. A first plurality of parallel laid yarns are arranged at a first angle relative to a machine direction. The first set of yarns overlay on at least one of the first or second sides of the scrim. A second plurality of parallel laid yarns are arranged at a second angle relative to the machine direction. The second angle is different than the first angle, and the second yarns are disposed in a layer on top of the first yarns. A third plurality of parallel laid yarns are arranged at a third angle relative to the machine direction. The third angle is different from the first and second angles. The third yarns are disposed in a layer on top of the second yarns. The first, second, and third yarns are attached to at least one of the first and second sides of the scrim to form a subassembly having a first and second side. A fibrous material, in the form of discrete staple fibers consolidated together through entanglement of the individual fibers, is attached to at least one of the first and second sides of the subassembly. A polymeric material encapsulates the subassembly and the fibrous material to form a conveying belt.

The modulus and tear strength in multiple directions for the conveying belt of the present invention is superior to conventional belts.

The present invention may be used in many conveying belt applications including but not limited to powerturn conveying belting applications.

BRIEF DESCRIPTION OF THE DRAWINGS

The invention is illustrated in the drawings in which like reference characters designate the same or similar parts throughout the figures of which:

FIG. 2 is a table showing example test results for a powerturn belting made using a reinforcement constructed of a woven scrim stitchbonded to triaxial yarns;

FIG. 3 is a table comparing test results of conventional belting used in powerturn applications against a powerturn belting made using a reinforcement constructed of a woven scrim stitchbonded to triaxial yarns;

FIG. 4 is a radial graph showing tensile moduli at 45° intervals of belt made using conventional woven biaxial reinforcement;

FIG. 5 is a radial graph showing the tensile moduli at 45° intervals of a belt made using a balanced conventional woven biaxial reinforcement;

FIG. 6 is a radial graph showing the tensile moduli at 45° intervals of a belt according to the present invention;

FIG. 11 is a partial plan view of a scrim;

FIG. 12 is a cross-sectional view of an interwoven two-ply fabric;

FIG. 13 is a diagrammatic view of a multi-axial yarn feed device;

FIG. 14 is a perspective view showing the orientation of the yarns in the woven scrim and parallel laid yarns; and, FIG. 15 is a side elevational view of one embodiment of the composite belt of the present invention.

DETAILED DESCRIPTION OF THE INVENTION

Figure 1:
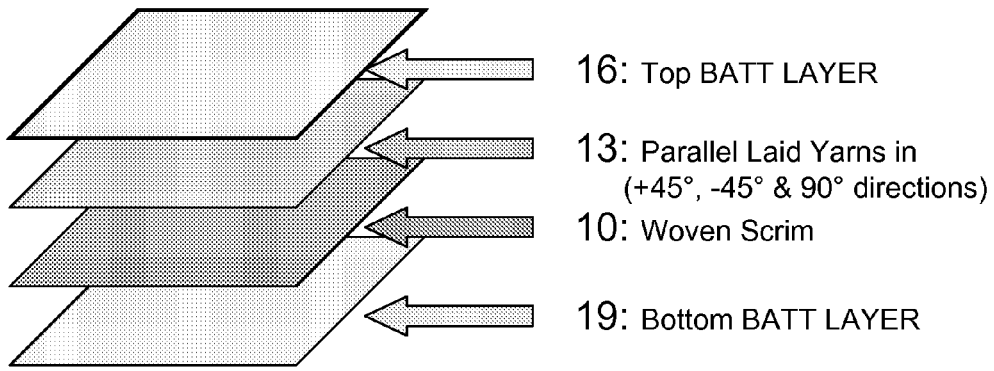
FIG. 1 is a schematic illustration of the composite showing the layered composition of the present invention.

Referring to FIG. 1, the base fabric for the present invention may be a conventional woven scrim 10 (strength member made of woven machine direction yarns and cross-machine direction yarns) or an interwoven design as discussed below. The machine direction yarns and the cross-machine direction yarns are provided in an open weave cloth as the scrim. Any weave may be used including a plain weave as shown in FIG. 11. The weave in FIG. 11 includes machine direction warp yarns 110 and cross machine direction weft yarns 113. The yarn selection, the weave selection and the yarn density of warp and weft yarns is selected so as to achieve a balanced fabric structure of the stitchbonded composite. Low thermal shrinkage behavior in yarns is desirable in selection of yarns. Choice between spun, filament or other yarn types is made based on the belt design constraints. Also, the yarns may be selected from a wide variety of synthetic yarns, such as polyester, polyamide, viscose rayon and like yarns or natural yarns like cotton or silk.

The nature of the cross-machine direction yarns is as critical as the machine direction yarns, and the yarns may comprise any conventional synthetic yarns. The denier of the machine direction and cross-machine direction yarns can be between 400 denier and 4000 denier without limitation. The density of the weave is selected to provide a scrim weight of from between about 8 ounces per square yard to about 24 ounces per square yard for optimum strength. The results with a woven scrim and triaxial stitchbonded yarns are discussed below in connection with FIG. 2.

The woven scrim for the present invention comprises an interwoven multi-ply synthetic fabric shown in FIG. 12. The weave design change from a plain woven scrim to a multiply interwoven design allows for increased density in fabric cover resulting from increase in the yarn density in warp and weft yarns. The weave change also facilitates ease of penetration of stitch needles when forming the weft knit stitchbonded composite as described below. As shown in FIG. 12, there are multiple plies of machine direction warp yarns 150 interwoven with cross machine direction weft yarns 153.

A plurality of parallel laid yarns 13 having a denier of 400-4000 typical are overlaid on the base fabric or scrim 10 by means of a multiaxial yarn feed device 14 (FIG. 13). The yarns may be arranged in multiple layers separately at orientation angles from 0 degree to 180 degrees with respect to the machine direction (0 degree). An example of an arrangement with triaxial parallel laid yarns is provided in FIG. 14. Other arrangements of the yarns such as quad-axial may also be suitable.

The parallel laid yarn in multiple layers 13 at different orientation angles may be stitched and/or bonded to the base fabric 10 by means of weft knitting stitch-bonding machines or fused/bonded by other means (i.e., thermal bonding, epoxy adhesives). The bonding between the base fabric and the parallel laid yarn layers in weft knitting technology is achieved by forming stitches using synthetic textured yarns. The resulting composite textile yarn assembly thus may have yarns oriented in many independent directions (formed i.e., 0, 90, +45, and −45 degrees) and the assembly thus formed acts as the reinforcement member within the textile composite.

Figure 7:
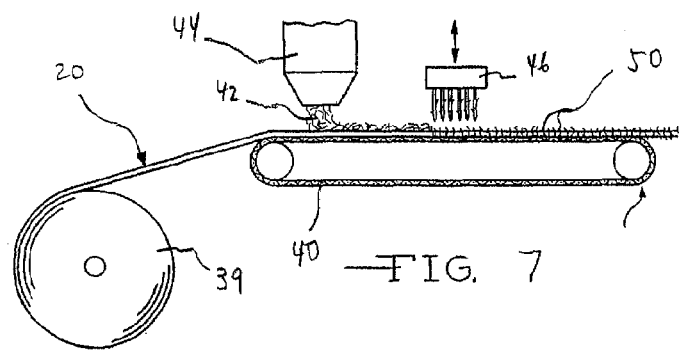
FIG. 7 is an elevational view illustrating the needling of a non-woven web of staple fibers to a scrim.
Figure 8:
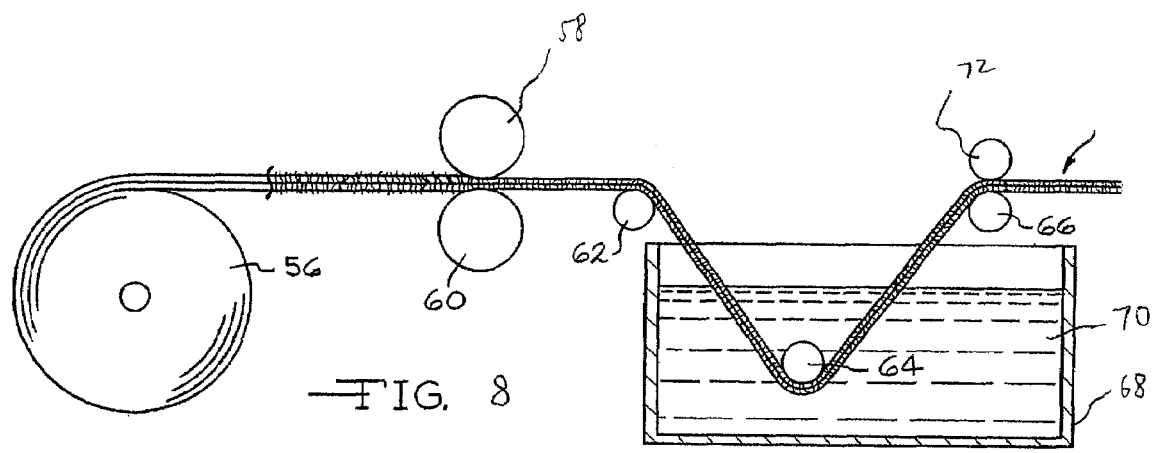
FIG. 8 is an elevational view illustrating the subassembly moving through a bath of elastomeric material.

Batts 16, 19 of staple synthetic fibers may be needled to either or both faces of the subassembly 20 created by stitchbonding the parallel laid yarns 13 to the scrim 10. As shown in FIG. 7, the subassembly 20 may be conveyed from a roll 39 onto a conventional conveyor 40 rotating in a clockwise direction, as shown with respect to the orientation of FIG. 1 moving the subassembly 20 from left to right. Discrete staple fibers 42, such as are provided in a non-woven web of fibrous batt may be spread in a generally uniform distribution over the upper surface of the subassembly 20 from a web laying mechanism 44. Multiple layers of fibrous web (batt) are laid onto subassembly 20 in a reciprocating manner to obtain desirable batt fiber weight. A needling apparatus 46 serves to consolidate the staple fibers 42 through entanglement and to thereby integrate the staple fibers 42 to the subassembly 20. The batt 16, 19 may be of randomly oriented synthetic carded fibers. As an alternative, the fibers may be directionally oriented within the batt by methods known to those of ordinary skill in the art. The batt of staple synthetic fibers may have an overall weight from between about 2 oz. per square yard to 100 oz. per square yard. The staple fibers may have different fineness (denier/dtex) and a range of denier, which is preferred for the yarns in the scrim, may be selected. The batt may be pre-needled using conventional techniques to obtain some integrity of the staple fibers prior to needling the batt to the subassembly. The technique of needling is well-known and the details need not be recited here: see for example U.S. Pat. No. 2,059,132 describing conventional needling operations and which is incorporated herein by reference. The coarseness of the felting needles used, the barb configurations, number, size, and other variables are dependent somewhat on the degree of openness between the textile yarns, so as to avoid rupture of the textile yarns. In general, but not limited to, a No. 32 gauge needle is preferred, with the barbs oriented so as not to tear the machine direction yarns. Needling is carried out to produce a needled subassembly. The resulting nonwoven composite is comprised of a reinforcement member made of yarns, sandwiched on both sides by fiber batting 16, 19 where the fiber to fiber entanglement and the fiber to yarn entanglements resulting from the needle-punching process maintains the integrity of the nonwoven composite structure.

The needled subassembly 50 may be heat set in an oven (not shown) to thermally stabilize the stitchbonded composite fabric comprising the woven scrim before the nonwoven is subject to the saturation step. During heat setting, the fabric may be tensioned in the machine direction under from between 0.5 to 22 lbs per inch. The tensioning obviates wrinkles across the width and along the length of the belting. Heat setting is carried out under hot air temperatures or other methods dependent on the nature of the fibers and yarns employed in the subassembly. Those skilled in the art will know which temperatures to select depending on the materials.

Figure 10:
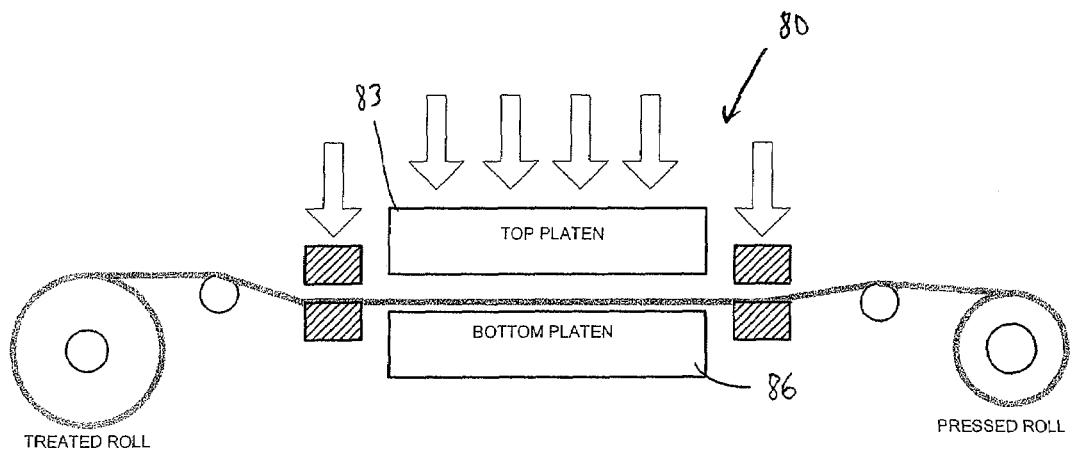
FIG. 10 is a schematic diagram showing the subassembly passing through a heated platen press.
Figure 9:
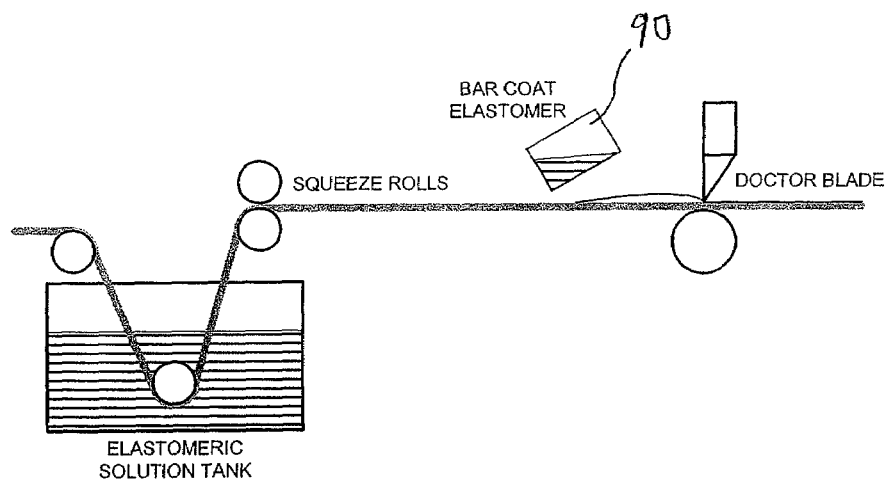
FIG. 9 is a schematic diagram illustrating a top coat step.

A wide range of liquid polymeric saturants may be employed for saturation of the belting including acrylonitrile butadiene rubber, styrene-butadiene polymer, poly-butadiene, EPDM, polyurethane, silicone rubber etc. The saturation of the heat set needled subassembly will provide high loading of elastomer, substantially penetrating the stitchbonded base fabric so as to impregnate the fibrous layer. The majority of voids in the stitchbonded base fabric and in the fibrous layer are filled with the elastomeric material so that the elastomer is distributed throughout the body of the final product. The heat set needled subassembly 56 may be calendered by rollers 58 and 60 prior to being guided by rollers 62, 64 and 66 in and out of a vessel or tank 68 containing a solution of the polymeric elastomer material 70. The depth of roller 64 below the level of liquid elastomer 70 may control the exposure time of subassembly 56 to the elastomeric material 70. The subassembly 56 leaving container 68 is now saturated with the liquid elastomeric material 70 and if needed, a fourth roller 72 can be provided in conjunction with roller 66 to squeegee or wipe excess liquid elastomer from the belting. It will be appreciated that a single trip through tank 68 may suffice for saturating some beltings, while multiple saturation steps with intermediate squeeging or partial drying steps may be required to fully saturate dense fibrous layers in other needled beltings. Curing may be affected by any means appropriate for the polymeric saturant. For example, the belting may be cured by heat for heat curable elastomers. In FIG. 9, a thin topcoat 90 of thermoset acrylic, silicone, polyolefin, polypropylene, polyethylene, PVC, polyurethane, etc., cover may be applied to the top side of the composite assembly to enhance cut and scratch resistance, modify coefficient of friction or reduce noise, for example. As shown in FIG. 10, the saturated belting 75 can be passed through a heated platen press 80 at a temperature sufficient to cure the elastomer. Pressures from between about 50 lbs. per square inch to about 200 lbs per square inch are practical and illustrative of pressures that may be employed. The saturated belting 75 may be pressed between a top platen 83 and a bottom platen 86 and cured under pressures of from between about 90 lbs per square inch to 130 lbs per square inch. The addition of the elastomers will further consolidate the non-woven batt and add abrasion resistance. By using a patterned surface impression medium, the belting is molded during curing to mold the impregnated material so as to form at least one plane surface and one surface patterned or with raised portions, i.e., an impression surface. The impression surface is molded to provide a similar appearance and function as the surface of a traditional woven synthetic belt. The raised impression may be of any geometric configuration such as semi-hemispheres, bars, grooves etc. and is raised above off the lower portions of the top surface of the belting.

Figure 15:
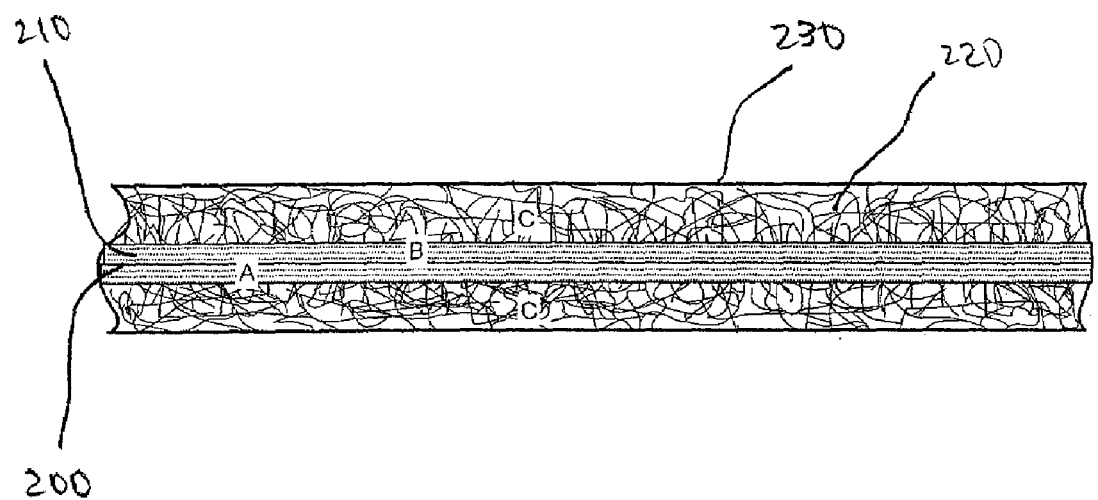

Turning to FIG. 15, one embodiment of the present invention is shown. The woven substrate 200 is disposed between parallel laid multiaxial yarns 210 and a fibrous batt 220 is needled to both faces. The assembly is encapsulated in an elastomeric material 230.

Returning to FIG. 2, the physical properties of a composite belt according to the present invention made using an interwoven scrim stitchbonded to triaxial yarns as reinforcement are shown.

In FIG. 3, a table comparing belting with a 2-ply interwoven polyester fabric stitchbonded to triaxial yarns according to the present invention to two prior art belts A and B is shown. Belt "A" is a conventional plied belting product made of plain woven reinforcement on one face and two-ply interwoven fabric impregnated with elastomer on the other face. Belt "B" is a nonwoven belting product that uses a conventional biaxial woven reinforcement. As shown, the modulus and tear strength in multiple directions is superior for the belt of the present invention considering the reduction in weight and thickness.

In FIG. 4, a graph shows the tensile moduli (N/mm) at three different extensions for a belt made with conventional woven biaxial reinforcement. The tensile moduli are highest in the machine direction and are far lower in the other directions.

In FIG. 5, a graph shows the tensile moduli (N/mm) at varying extensions for a belt made with balanced weave woven reinforcement. The tensile moduli are balanced in the machine and the cross machine directions, whereas the tensile moduli are much smaller in the bias (±45°) directions.

FIG. 6 illustrates the tensile moduli (N/mm) at varying extensions for a belt according to the present invention. As shown the belt according to the present invention demonstrates significant improvement in isotropy in tensile moduli in 0°, 90°, +45° and −45° directions.

What is claimed is:

1. A conveyor belting, comprising:
    a scrim having a first side and a second side;
    a first plurality of parallel laid yarns arranged at a first angle relative to a machine direction, the first yarns overlaid on one of the first and second sides of the scrim;
    a second plurality of parallel laid yarns arranged at a second angle relative to the machine direction, the second angle being different than the first angle, the second yarns being disposed in a layer on top of the first yarns;
    a third plurality of parallel laid yarns arranged at a third angle relative to the machine direction, the third angle being different from the first and second angles, the third yarns being disposed in a layer on top of the second yarns;
    wherein the first, second, and third yarns are attached to at least one of the first and second sides of the scrim to form a subassembly having a first and second side;
    a batt attached to at least one of the first and second sides of the subassembly; and,
    a polymeric material encapsulating the subassembly and the batt.

2. The belting of claim 1, wherein the first plurality of parallel laid yarns have a denier of 400-4,000.

3. The belting of claim 1, wherein the scrim has a weight between 8 ounces per square yard and 24 ounces per square yard.

4. The belting of claim 1, wherein the first angle is selected from the group consisting of (zero, +45, −45, and 90).

5. The belting of claim 1, wherein the first, second, and third angles are +45, −45 and 90 degrees respectively.

6. The belting of claim 1, wherein the parallel laid yarns are stitch bonded to the scrim.

7. The belting of claim 1, wherein the scrim is plain woven.

8. The belting of claim 1, wherein the scrim is a multi-ply interwoven scrim.

9. The belting of claim 1, wherein the batt has a weight between about 2 ounces per square yard to 100 ounces per square yard.

10. The belting of claim 1, wherein the parallel laid yarns are attached to at least one of the first and second sides of the scrim.

11. The belting of claim 1, wherein the batt is needled to both sides of the subassembly.

12. The belting of claim 1, wherein the parallel laid yarns are triaxial.

13. The belting of claim 1, further comprising a fourth plurality of parallel laid yarns arranged at a fourth angle between 0 and 180 degrees relative to the machine direction, the fourth angle being different from the first, second, and third angles.

14. The belting of claim 1, wherein the batt is formed by staple fibers consolidated together through entanglement of the individual fibers.

15. A method for manufacturing a conveyor belting, comprising:
    providing a scrim having a first side and a second side;
    overlaying a first plurality of parallel laid yarns on at least one of the first and second sides of the scrim, the first yarns being arranged at a first angle relative to a machine direction;
    placing a second plurality of parallel laid yarns on the first yarns, the second yarns being arranged at a second angle relative to the machine direction; the second angle being different than the first angle;
    placing a third plurality of parallel laid yarns on the second yarns, the third yarns being arranged at a third angle relative to the machine direction; the third angle being different than the first and second angles;
    attaching the first, second, and third yarns to at least one of the first and second side of the scrim to form a subassembly having a first side and a second side;
    attaching a batt to at least one of the first and second side of the subassembly;
    encapsulating the subassembly and the batt with a polymeric material to form a conveying belt.

16. The method of claim 15, wherein the scrim is plain woven.

17. The method of claim 15, wherein the scrim is multi-ply interwoven.

18. The method of claim 15, wherein the fibrous materials are attached to the subassembly by needling.

19. The method of claim 15, wherein the subassembly is heat set.

20. The method of claim 15, wherein the subassembly is encapsulated by saturation with a liquid polymer.

21. The method of claim 15, wherein the subassembly is calendered.

22. The method of claim 20, wherein the saturated belting is passed through a heated platen press at a temperature sufficient to cure the elastomer.

23. The method of claim 15, wherein the conveying belt is provided with a conveying surface having at least one plane surface with discontinuities disposed thereon to emulate the appearance of the surface of a woven synthetic belt.

24. The method of claim 15, wherein the first, second, and third yarns are attached to at least of the first and second sides of the scrim.

25. The method of claim 15, wherein the batt is attached to both sides of the subassembly.

26. The method of claim 15, wherein the first, second, and third angles are +45, −45, and 90 degrees respectively.

* * * * *